INVENTORS
FREDERICK L. POST
SAMUEL K. RAKER
BY William V. Schelberg
AGENT

MAGNETIC CORE DEVICE

Filed Feb. 20, 1959 2 Sheets-Sheet 2

United States Patent Office 3,126,530
Patented Mar. 24, 1964

3,126,530
MAGNETIC CORE DEVICE

Frederick L. Post, Poughkeepsie, N.Y., and Samuel K. Raker, Washington, D.C., assignors to International Business Machines Corporation, New York, N.Y., a corporation of New York Filed Feb. 20, 1959, Ser. No. 794,712
16 Claims. (Cl. 340—174)

This invention relates to magnetic switching devices and more particularly to improved magnetic structures for use in memory arrays and switching systems.

The use of magnetic cores capable of attaining bistable states of flux remanence in storage and switching systems employing different selection techniques is well known and is described, for example, in a book entitled Digital Computer Components and Circuits, by R. K. Richards, which is published by the D. Van Nostrand Co., Inc. Heretofore, difficulty has been experienced when such memory arrays and switching systems are packaged for assembly and use in today's electronic computers primarily because a number of windings or wires must be passed through a single aperture of the core. It has been found that a storage element may be constructed which requires only one wire per aperture, thus eliminating the manufacturing difficulties encountered in the packaging of memory arrays and the like employing prior art storage elements.

A magnetic element, in accordance with the principles of this invention, having one wire per aperture may be constructed by providing a magnetic multipath element having associated therewith a first and a second input winding, and inhibit and/or bias windings. In a first embodiment, the core includes five openings comprising a central aperture and four secondary apertures equidistant from the central aperture and centrally located in the main flux path of the core. The first input winding threads through a first and a second of the secondary apertures, the second input winding threads through the central aperture, the sense winding through the third of the secondary apertures, while the inhibit winding threads through the fourth of the secondary apertures. This element is primarily designed to be utilized in anti-coincident methods of core selection, but also has utility as a logical device capable of performing logical operations which will become evident. When the element is employed in anti-coincident systems, the first input winding is energized at all times that the second input winding is energized except when the core is selected to store information, arbitrarily referred to as writing a "1," or to read out this information, which is arbitrarily referred to as reading, or reset to "0." Simultaneous with selection of the core by the de-energization of the first input winding, the second input winding is energized with a current of one polarity for the writing operation or a current of opposite polarity for the reading operation. If during the writing operation, it is desired to inhibit the core from changing states, the inhibit winding is simultaneously energized to negate the action which ordinarily is manifested by energizing the second input winding. The operation is such that, when selection of the core takes place, a clockwise or counter-clockwise direction of flux takes place in the structure depending upon whether the core is to be read or written, respectively. When the first input line is again energized, localized flux switching is effected about one of the secondary apertures threaded by this winding, depending upon whether the core was previously read or written, and causing further flux reversal in part of the remaining core structure but not within the material linked by the sense winding.

In another embodiment of this invention which employs the same number of apertures, the element is primarily adapted to be incorporated in systems using coincident-current selection techniques and employs biased flux principles of switching. A bias winding is provided which threads a first and a second aperture to cause a biased flux configuration in the core, while a first and a second input winding threads through a third and a forth aperture, respectively. A sense winding is also provided which threads through a fifth aperture of the core. The bias winding is continuously energized to provide a flux in the core structure which must be overcome before the switching takes place. Coincident energization of the input windings with pulses of like polarity are employed to overcome this bias to either read or write the core. Upon cessation of the input signals, the bias then causes localized flux switching within the structure but does not disturb the direction of flux within the material linked by the sense winding. In such a structure, inhibiting the writing operation is accomplished by increasing the bias. A third embodiment is disclosed employing the same principles with the addition of separate inhibit winding. This third embodiment comprises a core with six apertures having the windings and connections in accordance with the second embodiment described above with the additional provision of an inhibit winding which threads through the additional sixth aperture. It should be noted that, since the core is biased, large drive currents may be employed to obtain correspondingly faster switching speeds of the elements.

Accordingly, a prime object of this invention is to provide an improved magnetic core for use in memory matrices.

A further object of this invention is to provide an improved magnetic core structure having a plurality of apertures and only one winding per aperture.

Still another object of this invention is to provide novel magnetic multipath devices.

Yet another object of this invention is to provide novel multipath storage elements having a plurality of apertures and only one winding per aperture which employ biased flux principles of operation.

Other objects of the invention will be pointed out in the following description and claims and illustrated in the accompanying drawings, which disclose, by way of example, the principle of the invention and the best mode which has been contemplated of applying that principle.

In the drawings:

FIG. 1 illustrates one embodiment of the storage element of this invention.

FIG. 2*a* illustrates the relative flux patterns obtained upon selection of the core of FIG. 1 for the write operation.

FIG. 2*b* illustrates the relative flux pattern of the core of FIG. 1 after the write "1" operation upon reenergization of one drive line.

FIG. 3*a* illustrates the relative flux pattern obtained upon selection of the core of FIG. 1 for the read or reset to "0" operation.

FIG. 3*b* illustrates the relative flux pattern of the core of FIG. 1 after the read operation upon reenergization of one drive line.

Figure 5:
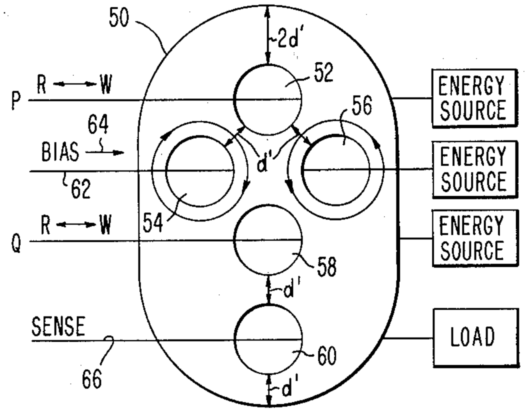
FIG. 5 illustrates another embodiment of a storage core of this invention which employs biased flux principles.
Figure 6A:
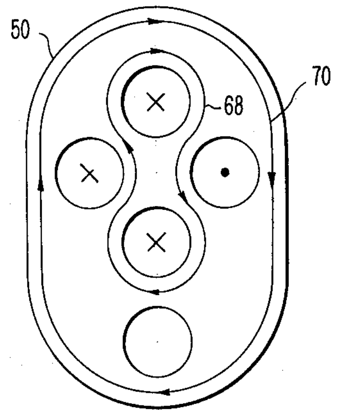

FIG. 6*a* illustrates the relative pattern obtained upon selection of the core of FIG. 5 for the write "1" operation.

Figure 6B:
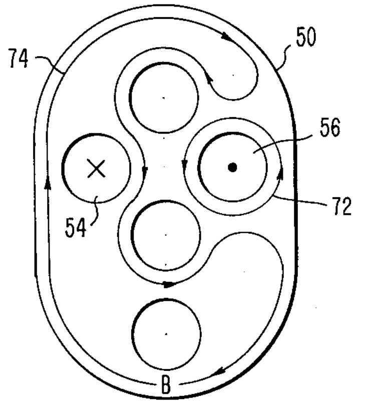

FIG. 6*b* illustrates the relative flux pattern of the core of FIG. 5 after the write "1" operation.

Figure 7A:
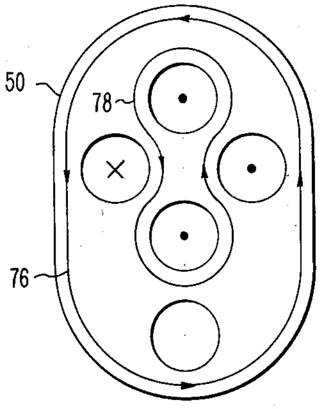

FIG. 7*a* illustrates the relative flux pattern obtained upon selection of the core of FIG. 5 for the read, or reset to "0" operation.

Figure 7B:
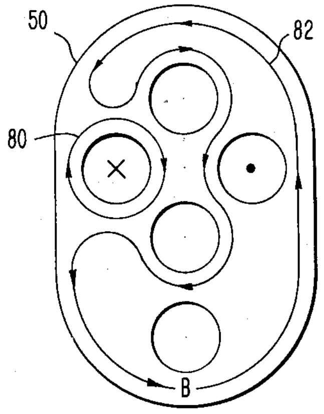

FIG. 7*b* illustrates the relative flux pattern of the core of FIG. 5 after the read operation.

Figure 8:
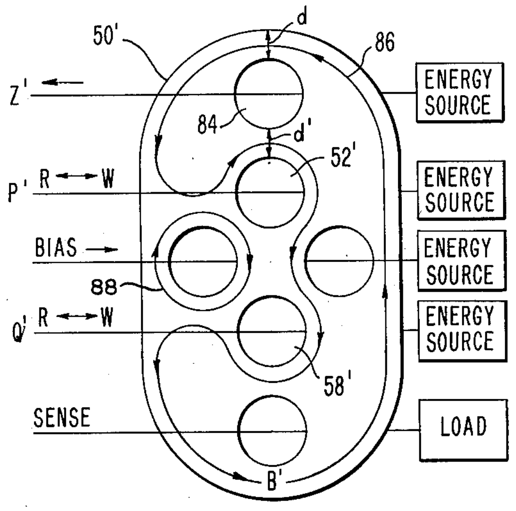

FIG. 8 illustrates another embodiment of this invention wherein a separate inhibit means is provided for further selection of a core employing biased flux principles.

Figure 1:
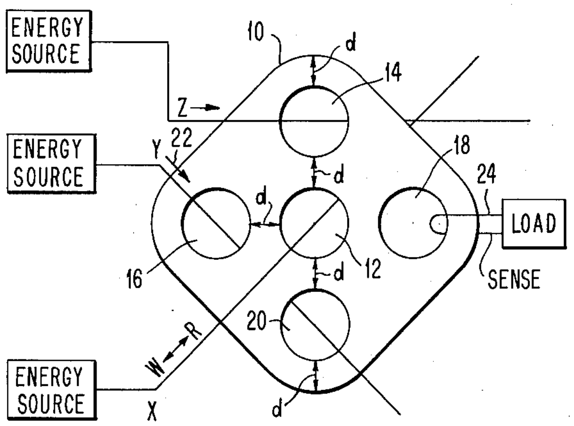

Referring to FIG. 1, a magnetic multipath core element 10 is provided made of material exhibiting a substantially rectangular hysteresis characteristic, which is characterized by having bistable states of remanent flux density, arbitrarily referred to as "0" and "1." The element 10 has a central aperture 12 and a number of surrounding secondary apertures 14, 16, 18 and 20. Each of the apertures 14, 16, 18 and 20 are separated from the central aperture 12 and from the outer extremities of the element 10 by one flux path of magnetic material each having equal cross-sectional areas, *d*, and are separated from one another by at least twice this amount of cross-sectional area, 2*d*. The apertures 14, 16, 18 and 20 are preferably located in the center of the main circular flux path through the core and may be considered to divide the core material into two circular magnetic circuits or flux paths. The first of these flux paths exists primarily between the inner circumference of the core and the innermost portions of the apertures with the second flux path existing primarily between the outermost portions of the apertures and the outer circumference of the core and, in the description to follow, are referred to as the inner and outer flux paths, respectively.

The element 10 is provided with a drive line Y threading through the apertures 16 and 20, which, when energized, passes a current as indicated by an arrow 22. A drive line X threads through the aperture 12 and is adapted to be energized by a current of one polarity for writing a "1" and by a current of an opposite polarity for reading a "1" or resetting the element 10 to "0," as is indicated by a reference W and R, respectively. The aperture 14 of the element 10 is threaded by an inhibit drive line Z which is adapted to inhibit the writing of the element 10, while the aperture 18 is threaded by a sense line 24 which links the outer flux path or leg A of the element 10 and provides an output signal whenever a flux change takes place in the material of the leg A.

A dot (·) and a cross (×) notation is employed in the apertures of some of the drawings to designate a current passing through the line threading the aperture, describing an arrow-type notation for ease of presentation. The cross is employed to designate current passing through a line energized which is directed into the page, while the dot designates current out of the page. The cross may be thought of as the tail of an arrow, while the dot is at its head.

The element 10 of FIG. 1 is designated to operate as a logical device and more particularly in a memory array employing anti-coincident selection principles wherein the Y line is energized at all times to prevent switching of the element 10 except when the element is selected for the reading or writing operation, at which time, the X line is energized in either the R or W direction, respectively. In such memory arrays an additional selection of the various elements 10 is required, i.e. the inhibit selection, which is adapted to inhibit the writing of a "1" into a storage element. Such is the function of the Z inhibit line which is energized simultaneously with the energization of the X line in the W direction. In the detailed explanation to follow, the use of such an element to perform logical operations will be evident.

Figure 2A:
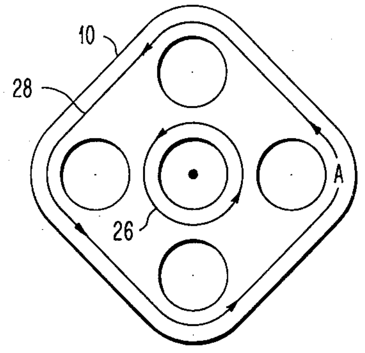

Referring to the FIG. 2*a*, if a "1" is to be written into the element 10, selection is accomplished by the de-energization of the Y line, while simultaneously the X line is energized with a current passing in the W direction as indicated by the dot in the aperture 12. Current flowing in the X line at this time sets up a counter-clockwise flux in the inner and outer flux paths as is shown by a flux line 26 and a second flux line 28, respectively. Upon termination of the write signal W on the X line, the Y line is again energized since selection may now be desired in another part of the memory to be set up a current in the Y line as shown in the FIG. 2*b*.

Figure 2B:
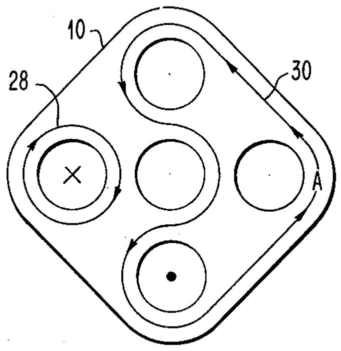

Referring to the FIG. 2*b*, the current in the Y line tends to cause a counter-clockwise direction of flux about the aperture 20 and a clockwise direction of flux about the aperture 16. A clockwise flux about the aperture 16 is established as is shown by the flux line 28 which "kidneys" the flux within the element 10 to provide a flux pattern about the apertures 14, 18 and 20 as is shown by the flux line 30. Although the element 10 has attained another stable state, the direction of flux within the leg A, which is linked by the sense line 24, has remained unchanged.

Figure 3A:
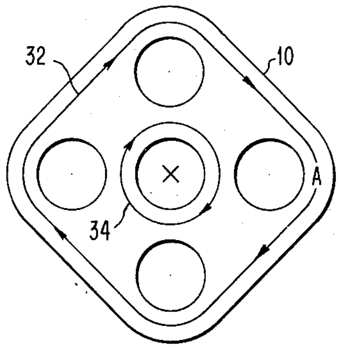
Figure 3B:
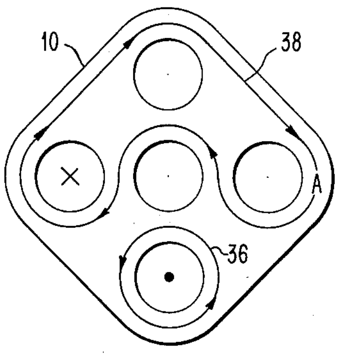

When the element 10 is to be read out or is reset to "0," again the Y line is disabled and the X line is energized with a read signal R of opposite polarity. Referring to the FIG. 3*a*, this current sets up a clockwise flux in the element 10 as is indicated by the flux lines 32 and 34. Note that the direction of flux within the leg A linked by the sense line 24 has reversed, thus inducing an output signal in the line 24 indicative of a previous stored "1." Upon cessation of the signal on the X line, the Y line is again energized to provide a current directed into the apertures 16 and 20 of the element 10 as shown in the FIG. 3*b*. Referring to the FIG. 3*b*, again a clockwise flux tends to be set up about the aperture 16 and a counter-clockwise direction of flux about the aperture 20. As shown, a counter-clockwise flux line 36 is set up about the aperture 20 to again "kidney" the flux within the element 10 and set up a flux pattern about the apertures 14, 16 and 18 as indicated by the flux line 38. Again, although the element 10 has attained still another stable state, note that the direction of flux within the leg A has remained similar to that shown in the FIG. 3*a*.

Figure 4:
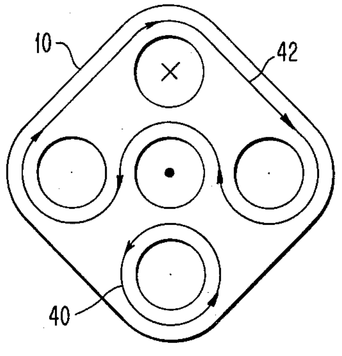
FIG. 4 illustrates the relative flux pattern when the core of FIG. 1 is inhibited during a write "1" operation.

If the element 10 is to be inhibited during a write operation the Z line may overlap or be simultaneously energized with the X line as indicated in the FIG. 4. Referring to the FIG. 4, and considering the initial flux pattern of the element 10 to be that as shown in the FIG. 3*b*, the current passing through the X line tends to set up a counter-clockwise flux in the element 10, as shown in the FIG. 2*a*, while the current in the Z line tends to set up a clockwise flux about the aperture 14. Since the inner flux path of the element 10 intermediate the apertures 12 and 14 is already saturated in a counter-clockwise direction, as shown in the FIG. 3*b*, and the outer flux path intermediate the aperture 14 and the outer circumference of the element 10 is held in a clockwise direction, no change takes place and the flux pattern described by the flux lines 40 and 42 are seen to be similar to the flux lines 36 and 38, respectively, in the FIG. 3*b*. It should be noted that the direction of flux within the leg A remains in that direction provided upon reset of the element 10, as shown in the FIG. 3*a* or 3*b*, and insure inhibiting during the write "1" operation. If, in such a memory selection mode, it were desired to energize the Z line at all times except when the reading or writing operation takes place, this too may be done without any change in the operation of the element 10 except that in the FIG. 2*b* the flux line 30 would break up and describe a counter-clockwise flux pattern about the aperture 14 and a clockwise flux pattern about the apertures 18 and 20. In considering the embodiment of FIG. 1, if the element 10 is switched from the "0" to the "1" state, an output indication is provided on the sense line 24 and, if the Y line is energized after this switching operation, the element is switched to an intermediate stable state providing no output signal on the line 24. An output signal is provided when the element 10 is switched back to the "0" state but none is provided if, again, the Y line is energized. Thus, the element 10 is capable of providing a positive, a negative, or an absence of output signal for different stable states and is operative as a ternary output device. Further, if we consider the necessity of an absence of signal on the Y line and the presence of signal on the X line in order to switch the element 10 to the "1" state and provide an output signal, the device performs the function of "if and only if."

Referring to the FIG. 5, another embodiment of this invention is disclosed wherein a magnetic multipath core element 50 is shown made of material exhibiting a substantially rectangular hysteresis characteristic which is capable of attaining bistable states of remanent flux density, again referred to as "0" and "1." Element 50 is capable of performing many logical operations and is more specifically designed to operate in memory arrays which employ biased flux coincident-current selection principles wherein the remanent state of the element is switched by the coincidence of current pulses applied to suitable drive windings. In such a system, each element 50 is provided with means for saturating a plurality of flux paths within the element and further provided with a plurality of driving means inductively coupled to the element. The energization of a single driving means produces a driving M.M.F. less than the bias flux and is ineffective to alter the flux pattern in the biased paths while simultaneous energization of all the driving means in the same relative polarity produces a total M.M.F. sufficient to saturate the core in either a clockwise or counter-clockwise direction. Upon the cessation of the driving M.M.F., the original pattern of bias flux is reestablished and the flux in the paths of the element 50 is reversed. If the direction of the total flux is such as to effect a flux reversal in the path associated with the sense means, an output signal is produced. By increasing the magnitude of the bias M.M.F., the magnitude of each input pulse may be increased. Thus, high switching speeds are obtainable by using large pulses having short rise times in the millimicrosecond range. Further, the application of element 50 to perform binary logic, such as AND, and even providing ternary output indications will become apparent after a study of the detailed description and operation to follow.

The element 50 is provided with a first aperture 52, a second aperture 54, a third aperture 56, a fourth aperture 58 and a fifth aperture 60. The first aperture 52 has a P drive line threaded therethrough which is adapted to be energized by a current of one polarity for the reading and a current of opposite polarity for the writing operation, designated by R and W, respectively, while the aperture 58 has a Q drive line threaded therethrough which is adapted to be energized with a current of one polarity for the reading and of opposite polarity for the writing operation of the elements which is again designated as R and W. The apertures 54 and 56 are threaded by a bias line 62 which is energized by a current as indicated by an arrow 64 at all times to provide a flux which saturates the element 50 as shown by circular flux lines about the apertures 54 and 56, while a sense line 66 is provided and threads through the aperture 60, which links a path B (as shown in FIGS. 6*b* and 7*b*). Each of the apertures 52, 54, 56 and 58 are separated from one another by a flux path of equal cross-sectional areas while the aperture 60 is similarly separated from the aperture 58 by a flux path equal in cross-sectional area to those separating the apertures 52, 54, 56 and 58.

Assuming a write operation is desired, the P and Q lines are simultaneously energized with currents of corresponding polarity in the W direction which coincidently provide a stronger field to overcome the bias M.M.F. provided by current passing through the line 62 threading the apertures 54 and 56. The coincident energization of the P and Q windings of the element 50 sets up a clockwise flux pattern as indicated in the FIG. 6*a* by the flux lines 68 and 70. Upon termination of the signals in the P and Q lines, the bias provided by the line 62, shown by the dot and cross notation in the apertures 56 and 54, respectively, remains as is shown in the FIG. 6*b*. Referring to the FIG. 6*b*, the M.M.F. provided by the line 62 tends to set up a counter-clockwise flux pattern about the aperture 56 and a clockwise flux pattern about the aperture 54. In such structures, if any flux change takes place, the smallest possible change, i.e. that change requiring the least amount of energy, will occur which magnetically balances the structure. Consequently, if we consider a cylindrical flux pattern about the aperture 54 to take place, the flux in the remaining portion of the core would "kidney," while simultaneously a circular flux pattern about the aperture 56 would again require "kidneying" of the remaining flux within the element 50. However, the flux assumes a circular path about the apertures 56, as indicated by the flux line 72, to "'kidney" the core and set up a further flux pattern in the remaining portion of the element 50 as shown by a line 74. The pattern of the flux line 74 meets all the conditions of the current directed into the aperture 54 in that both sides describe a clockwise flux direction and the inner portion of the path is reversed, which is the path of least reluctance. Thus, even though the element 50 has attained another stable state of flux density, the direction of flux in the leg B has remained unchanged and there is no voltage induced in the winding 66.

If we wish to read the element 50, i.e. reset to "0," the P and Q lines are simultaneously energized with a current polarity indicated by the direction R in the FIG. 5. The simultaneous energization of the P and Q lines with similar polarity signals overcomes the bias applied by the line 62 to set up a counter-clockwise flux pattern in the element 50 as is shown by the flux lines 76 and 78. Upon termination of the read operation, the bias applied by the winding 62 takes over as is indicated by the cross in the aperture 54 and the dot in the aperture 56 in the FIG. 7*b*. Referring to the FIG. 7*b*, a clockwise flux pattern tends to be set up about the aperture 54 and a counterclockwise flux pattern about the aperture 56. Since the inner path is of least reluctance, a circular flux pattern is provided about the aperture 54, as shown by the flux line 80, while the remaining flux in the core is "kidneyed" to provide a flux pattern as is shown by the flux line 82. It should be noted that still another stable state of flux density has been attained by the element 50, but the direction of flux within the leg B is the same as provided in the FIG. 7*a*, insuring an absence of induced signal on the sense line 66. It should be realized that when the element 50 is in the stored "1" condition, as shown in the FIG. 6*b* and the reading operation is performed, reversal of flux within the leg B provides an induced voltage output on the sense line 66.

In the FIG. 5, there has been no provision for a separate inhibit line which may be used in three-dimensional matrices employing magnetic storage elements. Inhibition may be provided by an individual bias line for each plane of a three-dimensional memory which bias may be increased whenever inhibition is desired, or as shown in the FIG. 8, a further aperture may be provided in a core structure constructed in accordance with the principles of the embodiment of the element 50 with an inhibit line threaded therethrough.

Referring to the FIG. 8, an element 50', similar in respect to the structure of FIG. 5, is shown which employs similar windings wherein the same reference character and numerals are employed for ease of presentation and understanding, with the addition of a further aperture 84 which is separated from the upper aperture 52', by a flux path having a cross-sectional area equal to that separating the apertures threaded by the line Q' and the sense line. An inhibit line Z' threads through the aperture 84 and is adapted to be energized simultaneously with the P' and Q' lines to inhibit the writing operation. The direction of current passing through the Z' line is of opposite polarity than that provided in the P' and Q' line during the write operation, and tends to set up a counterclockwise flux pattern about the aperture 84 while current in the P' tends to set up a clockwise flux pattern about the apertures 52' and 58'. Since the original flux pattern of the element in the stored "0" condition is as indicated by the flux lines 86 and 88 in the figure, the pattern is unchanged. This may be understood by considering the flux pattern in each of the flux paths or circuits about the apertures 52′ and 58′ as shown. The direction of flux in each of the paths about the aperture 52′ describe a clockwise pattern as does the direction of flux in each of the paths about the aperture 58′. Further, the flux path described by the circuit intermediate the aperture 84 and the outer circumference of the element 50′ is held in a counter-clockwise direction due to the energization of the Z′ winding. Since the direction of flux within the leg B′ of the element 50′ has remained unchanged the element remains in the stored "0" condition.

Thus, the first embodiment of this invention provides a multipath magnetic core element adapted to be employed in systems employing anti-coincident current selection, while other embodiments of this invention provide such elements adapted to be employed in systems employing biased flux coincident current selection and in each of these embodiments only one wire is required to thread each aperture of the element. Such elements are not only adapted to be utilized as logical devices or in various type memory matrices and the like, but are recognized to be particularly amenable to fabrication and packaging techniques.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic device comprising a magnetic core capable of attaining a plurality of stable states of flux density and having a plurality of apertures and a centrally disposed aperture therein, a plurality of winding means coupled to said core with only one winding threading any one of said apertures, means including said winding means threading said centrally disposed aperture for alternately switching said core from one to another of said stable states, and a further one of said winding means being adapted as sense winding means along which an output signal is induced whenever said core is switched from one to another of said stable states.

2. A magnetic device comprising a magnetic core capable of attaining a plurality of stable states of flux density and having a plurality of apertures and a centrally disposed aperture therein, a plurality of winding means coupled to said core with only one winding threading any one aperture, a first means including that one of said winding means threading said centrally disposed aperture for alternately switching said core from one to another of said stable states, and further means including a second one of said winding means for inhibiting said first means, a third one of said winding means being adapted such that an output signal is induced therealong whenever said core is switched between said one and said another of said stable states.

3. A magnetic device comprising a magnetic core capable of attaining a plurality of stable states of flux density and having a plurality of apertures and a centrally disposed aperture dividing said core into a plurality of magnetic circuits, a plurality of winding means coupled to said core with only one winding threading any one aperture, and means for energizing a first one of said winding means threading said centrally disposed aperture with a signal of one polarity to cause said core to switch from a first to a second stable state and with a signal of opposite polarity to switch said core to said first stable state, another of said winding means being adapted such that an output signal is induced therealong whenever said core is switched between said first and said second stable states.

4. A storage element comprising a magnetic core capable of attaining a plurality of stable states and having a plurality of apertures and a centrally disposed aperture therein, a plurality of winding means coupled to said core so that only one winding means threads through any one aperture, means for energizing that one of said winding means threading said centrally disposed aperture with a signal of one polarity to cause said core to switch from a first to a second stable state and thereafter with a signal of opposite polarity to switch said core to said first stable state, and further means for energizing another of said winding means to inhibit the switching of said core from said first to said second stable state, a further one of said winding means being adapted such that an output manifestation is induced therealong on a switching of the stable state of said core.

5. A magnetic device comprising a magnetic core capable of attaining a plurality of stable states of flux density and having a plurality of apertures therein, a plurality of winding means coupled to said core so that only one winding means threads through any one aperture, means for energizing two of said winding means with signals of one polarity to switch said core from a first to a second stable state and thereafter with signals of opposite polarity to switch said core to said first stable state whereby an output signal is induced in another of said winding means whenever said core is switched from one to another of said stable states.

6. A storage element comprising a magnetic core capable of attaining a plurality of stable states of flux density and having a plurality of apertures therein, a plurality of winding means coupled to said core with one winding means threading any one aperture, means for energizing a first of said winding means at all times to provide a biased M.M.F. in said core, and further means connected to a second and a third of said winding means for energizing said second and third winding means coincidently with signals of one polarity to switch said core from a first to a second stable state and thereafter with signals of opposite polarity to switch said core to said first stable state, a switching of the stable state of said core being manifested by an output indication induced along a fourth one of said winding means.

7. A storage element comprising a magnetic core capable of attaining a plurality of stable states of flux density and having a plurality of apertures therein, a plurality of winding means coupled to said core so that only one winding means threads through any one aperture, first means for energizing a first of said winding means to cause an M.M.F. to be established in said core at all times, further means for coincidently energizing a second and a third of said winding means with signals of one polarity to overcome said first means and switch said core from a first to a second stable state and thereafter to coincidently energize said second and third winding means with signals of opposite polarity to switch said core to said first stable state, and another means for energizing a fourth of said winding means to inhibit the switching of said core to said second stable state, a fifth of said winding means being adapted such that an output signal is induced therealong each time said core is switched from one of said stable states to another.

8. A storage element comprising a magnetic core made of material capable of attaining a first and a second stable state of residual flux density, said core having a central aperture and a plurality of surrounding apertures, a first winding threaded through a first and a second one of said surrounding apertures, a second winding threaded through said central aperture, an inhibit winding threaded through a third one of said surrounding apertures, a sense winding threaded through a fourth one of said surrounding apertures along which an output signal is induced whenever said core is switched from one to another of said stable states, first means for normally energizing said first winding, second means for disabling said first means and for energizing said second winding with a pulse of one polarity to switch said core from a first to a second stable state and a pulse of opposite polarity to switch said core back to said first stable state, and means for energizing said inhibit winding to inhibit the switching of said core to said second stable state.

9. The element of claim 8 wherein said surrounding apertures are centrally located in the main flux circuit of said core about the central aperture.

10. A storage element comprising a magnetic core made of material capable of attaining a plurality of stable states of flux density, said core having a plurality of apertures therein, a first winding threaded through a first and a second one of said apertures adapted to be energized at all times, a first and a second input winding respectively threaded through a third and a fourth one of said apertures, a sense winding threaded through a fifth one of said apertures, first means for coincidently energizing said first and said second input windings with pulses of one polarity to switch said core from a first to a second stable state, and for thereafter coincidently energizing said first and said second input windings with signals of opposite polarity to switch said core to said first stable state whereby an output signal is induced along said sense winding whenever said core is switched from one to another of said first and said second stable states.

11. A magnetic device comprising a magnetic core capable of attaining a plurality of stable states of flux density having a plurality of apertures therein, a plurality of winding means coupled to said core with only one winding means threading any one aperture, first means including a first of said winding means for switching said core from a first to a second of said stable states when actuated, further means including a second of said winding means for inhibiting said first means when actuated concurrently with said first means and for switching said core to a third stable state when actuated subsequent to said first means, and other means including said first means for switching said core to said first stable state, a third of said winding means being adapted such that an output is induced therealong indicative of a switching of said core to said first and to said second stable states and no output is induced therealong on a switching of said core to said third stable state.

12. A device for storing binary data comprising a multiapertured magnetic core made of material exhibiting a substantially rectangular hysteresis characteristic, said core capable of attaining a plurality of flux states, sensing means threaded through one aperture and coupling in adjacent position of said core, the storage state of said device being represented by the direction of flux orientation along said adjacent portion, first winding means threaded through a centrally disposed aperture of said core for switching said core between a first and a second flux state whereby flux orientation along said adjacent portion is reversed and an output pulse indicative of the storage state of said core is induced along said sensing means, and second winding means threaded through other apertures of said core for switching said core from said first to a third flux state and from said second to a fourth flux state such that flux orientation along said adjacent portion is not reversed and the storage state of said core is not altered.

13. A device for storing binary data as set forth in claim 12 wherein said sensing means, said first winding means, and said second winding means are threaded on a single turn basis through respective ones of said apertures.

14. A device for storing binary data as set forth in claim 12 wherein said second winding means includes a first winding oppositely threaded through a pair of said other apertures, and means for normally energizing said second winding means so as to provide a biased M.M.F. in said core.

15. A device for storing binary data as set forth in claim 12 wherein said second winding means includes a second winding threaded through another of said apertures and means for energizing said second winding concurrently with said first winding means to inhibit a transfer of said core to said second flux state whereby reversal of flux orientation along said adjacent portion is prevented.

16. A device for storing binary data as set forth in claim 14 further including third winding means threaded through a remaining aperture of said core and means for concurrently energizing said first and said third winding means so as to overcome said biased M.M.F. in said core whereby said core is switched from said first to said second flux state.

References Cited in the file of this patent

UNITED STATES PATENTS

| | | |
|---|---|---|
| 2,689,328 | Logan | Sept. 14, 1954 |
| 2,818,555 | Lo | Dec. 31, 1957 |
| 2,863,136 | Abbott et al. | Dec. 2, 1958 |
| 2,869,112 | Hunter | Jan. 13, 1959 |
| 2,919,430 | Rajchman | Dec. 29, 1959 |
| 2,926,342 | Rogers | Feb. 23, 1960 |
| 3,014,204 | Lo et al. | Dec. 19, 1961 |

OTHER REFERENCES

"The Transfluxor," I.R.E., March 1956, pp. 321–332 (pp. 331–332 relied on).

"Multihole Ferrite Core Configurations and applications," H. W. Abbott and J. J. Suran, Proceedings of the I.R.E., vol. 45, No. 8, pages 1081–1093, August 13, 1957.

UNITED STATES PATENT OFFICE

CERTIFICATE OF CORRECTION

Patent No. 3,126,530 March 24, 1964

Frederick L. Post et al.

It is hereby certified that error appears in the above numbered patent requiring correction and that the said Letters Patent should read as corrected below.

Column 9, line 52, for "position" read -- portion --.

Signed and sealed this 15th day of September 1964.

(SEAL)
Attest:

ERNEST W. SWIDER
Attesting Officer

EDWARD J. BRENNER
Commissioner of Patents